United States Patent [19]
Ito et al.

[11] 4,269,323
[45] May 26, 1981

[54] HEAT INSULATED TANK

[75] Inventors: Nobuyoshi Ito, Tokyo; Hiroshi Morishita, Kawasaki; Minoru Morita; Takashi Fukano, both of Yokohama, all of Japan

[73] Assignee: Nippon Sanso Kabushiki Kaisha, Nishishinbashi, Japan

[21] Appl. No.: 947,696

[22] Filed: Oct. 2, 1978

[30] Foreign Application Priority Data

Feb. 3, 1978 [JP] Japan .................................. 53-11281
Feb. 3, 1978 [JP] Japan .................................. 53-11282

[51] Int. Cl.³ ............................................. B65D 90/04
[52] U.S. Cl. .................................. 220/423; 106/120; 220/456; 220/457; 220/901; 428/69; 428/163; 428/172; 428/304
[58] Field of Search .............. 52/309.9; 428/311, 312, 428/921, 158, 159, 160, 166, 167, 172, 71, 304, 68, 76, 69, 163; 220/901, 421, 423, 450, 444, 464, 456, 457, 902; 106/120

[56] References Cited

U.S. PATENT DOCUMENTS

| | | | |
|---|---|---|---|
| 2,012,617 | 8/1935 | Munters | 428/312 X |
| 2,301,483 | 11/1942 | Van Daam | 220/441 X |
| 2,540,354 | 2/1951 | Selden | 106/120 X |
| 2,748,008 | 5/1956 | Kalousek | 106/120 |
| 2,874,865 | 2/1959 | Canty et al. | 220/427 |
| 2,927,437 | 3/1960 | Rae | 220/426 X |
| 2,961,116 | 11/1960 | Jeppson | 220/421 |
| 2,969,092 | 1/1961 | Johnston | 220/421 X |
| 2,980,972 | 4/1961 | Kloote et al. | 52/309.9 X |
| 2,989,156 | 6/1961 | Brooks et al. | 220/421 |
| 3,016,317 | 1/1962 | Brunner | 428/159 X |
| 3,108,706 | 10/1963 | Matsch et al. | 220/423 |
| 3,150,793 | 9/1964 | Messer | 220/421 X |
| 3,167,933 | 2/1965 | Beckman et al. | 220/450 X |
| 3,184,371 | 5/1965 | Seidl | 428/312 X |
| 3,302,358 | 2/1967 | Jackson | 220/464 X |
| 3,317,643 | 5/1967 | Denny | 106/120 X |
| 3,406,030 | 10/1968 | Perrandin et al. | 106/120 X |
| 3,451,841 | 6/1969 | Kesten et al. | 428/312 X |
| 3,489,311 | 1/1970 | Folkerts | 220/901 X |
| 3,496,058 | 2/1970 | Schroter et al. | 428/160 |
| 3,652,310 | 3/1972 | Kraemer et al. | 106/120 |
| 3,679,446 | 7/1972 | Kubo | 106/120 |
| 3,765,558 | 10/1973 | Withers | 220/901 X |
| 3,915,725 | 10/1975 | Takahashi | 106/120 |
| 3,940,516 | 2/1976 | Gierek et al. | 428/921 X |
| 3,942,331 | 3/1976 | Newman, Jr. et al. | 220/421 X |
| 4,015,386 | 4/1977 | Cook | 428/71 |

Primary Examiner—Allan N. Shoap
Attorney, Agent, or Firm—Kane, Dalsimer, Kane, Sullivan and Kurucz

[57] ABSTRACT

A heat insulated tank is disclosed having inner and outer walls between which a supporting material is interposed. The material comprises a molding of alkaline earth metal silicates or a molding of composite material based thereon having a continuous open cell structure and subjected to heat treatment under vacuum. Inside and outside faces of said supporting material are provided with a suitable number of grooves. The entire surface of said supporting material is impregnated with a solution of sodium silicate, potassium silicate or ethyl silicate and subjected to baking.

The supporting material has a high insulating capability and a high resistance to compression, thus it is applicable to square shaped tanks in addition to conventional spherical or cylindrical ones. The tank is easy to manufacture with increased storage capacity.

1 Claim, 7 Drawing Figures

HEAT INSULATED TANK

BACKGROUND OF THE INVENTION

In the prior art, heat insulated tanks utilizing the vacuum heat insulation method are excellent in refrigerating capacity or heat retaining property and widely used for the purpose of storing, for instance, liquid oxygen, liquid nitrogen or liquefied natural gas or the like. However, there are many points to be improved. For example, heat insulated tanks of this kind are constructed with thick inner and outer tanks bearable against a vacuum load, and it is well known that the weight of heat insulated tanks becomes large and some supporting means for the inner tank is indispensable, so that the heat insulating effect is lowered. And, in reference to said vacuum load, the shape of heat insulated tank cannot but be made as a sphere or cylinder with curved ends. These shapes are disadvantageous in view of filling amount or storing capacity. Further, in a heat insulated tank for storing solid goods such as cold or refrigerated foodstuffs to be stored or conveyed, its economical value is very poor, so that in general, a heat insulated tank is used having inner and outer tanks and between which heat insulating material such as polyurethane foam is filled. Thus the heat insulated tank with vacuum heat insulation has not been practically used.

SUMMARY OF THE INVENTION

This invention relates to a heat insulated tank composed of inner and outer tanks and a space between said tanks which is heat insulated by vacuum.

It is a general object of this invention to improve a heat insulated tank according to usual vacuum heat insulation method.

It is the 1st object of this invention to provide a square shaped heat insulated tank similar to those tanks generally used for storing and conveying of cold or refrigerated foodstuffs, without limiting to spherical and cylindrical tanks, by adopting vacuum heat insulation.

It is the 2nd object of this invention to provide a light weight heat insulated tank with thin inner and outer walls by adopting vacuum heat insulation.

It is the 3rd object of this invention to provide a heat insulated tank without requiring any supporting means which has usually many troubles, by adopting vacuum heat insulation.

It is the 4th object of this invention to provide a cheap heat insulated tank which can be easily manufactured and assembled on the spot when occasion demands.

It is the 5th object of this invention to provide a heat insulated tank for many purposes also variable for low temperature apparatus requiring heat insulation such as an air separation plant to say nothing for easy storage of solid goods without being limited to fluid such as usual low temperature liquefied gas, by adopting vacuum insulation.

It is the 6th object of this invention to provide a heat insulated tank which has high heat insulation capability, relatively larger inner capacity and high economical value.

DESCRIPTION OF THE PREFERRED EMBODIMENT

Figure 1:
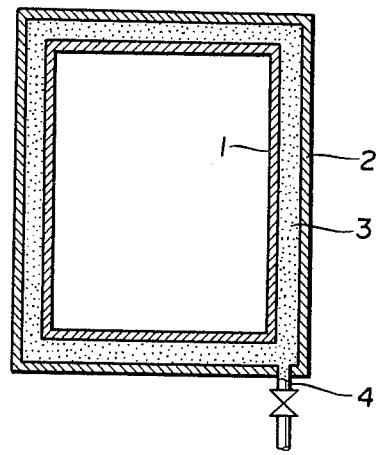
FIG. 1 is a cross-sectional view of a square shaped heat insulated tank.

In FIG. 1, a heat insulated tank of square shape is shown in cross-section, as an embodiment of this invention wherein 1 denotes an inner tank, 2 an outer tank, 3 supporting material between said tanks 1 and 2, and 4 a vacuum outlet. The supporting material 3 is made of a molding of alkaline earth metal silicates having a continuous open cell structure, and said molding, for example, is formed in a predetermined shape in such a manner that amorphous type silicic acid such as diatomaceous earth, calcium compound of slaked lime and the like, and water are subjected to heating and pressing to grow calcium silicate having a Xonotlite crystal structure into predetermined shape, and in this case, forming may be effected by adding asbestos and the like. The qualities of this molding are shown in Table 1 in comparison with that of perlite which is used in general vacuum heat insulation.

TABLE 1

| Comparison between calcium silicate molding (Xonotlite crystal structure) and perlite powder | | |
|---|---|---|
| Shape | Calcium silicate molding Molding | Perlite powder Powder |
| gravity | 0.1 g/cm$^3$ | 0.1 ~ 0.06 g/cm$^3$ |
| Degree of heat transfer (atmospheric pressure) | 0.033 Kcal/ m.Hr. °C. | 0.03 Kcal/ m.Hr °C. |
| Heat resisting property | 1000° C. | 650° C. |
| Cell structure | Continuous open cell structure | Closed cell structure |
| Anti-compression strength | > 6 kg/cm$^2$ | — |
| Hygroscopic property | ~ 5 wt % (in air) | Little |

As is apparent from Table 1, the calcium silicate molding has light weight of the bulk specific gravity of about 0.1 g/cm$^3$, heat resisting property of 1000° C., and compression resisting strength of more than 6 kg/cm$^2$, and has a structure of continuous open cell. And yet, the manufacturing process of calcium silicate is a simple hydrothermal reaction, and pressure molding is possible without adding any binder, so that out gas of calcium silicate molding is almost water and other out gas is negligible.

Figure 2:
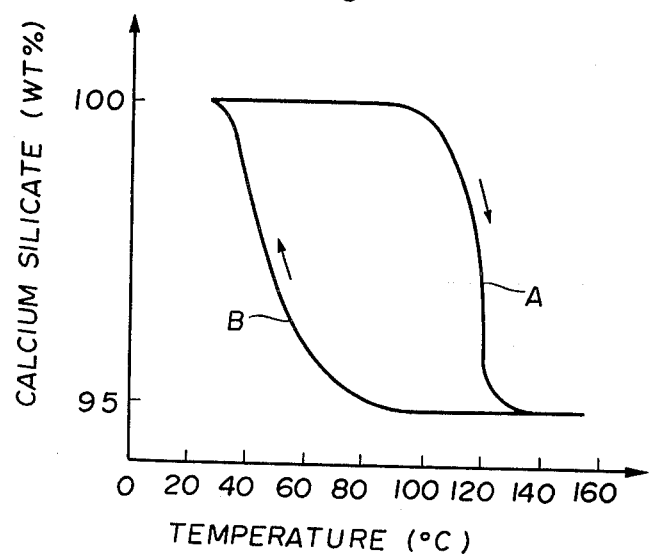
FIG. 2 shows moisture adsorption and release curves of calcium silicate molding.

When the above mentioned calcium silicate molding having Xonotlite structure is used as supporting material for a vacuum heat insulated vessel, at first this calcium silicate molding of predetermined shape is subjected to preheating degassing treatment in a heating furnace. As the condition of this treatment, normally calcium silicate molding is retained at about 200° C. for 2-hour, so that it becomes about constant weight and water content in the molding is almost surely removed. When higher temperature is applied, heating time is considerably shortened. Thus, the heated and dried calcium silicate molding has hygroscopic property. However, in a period of time until the heat insulating space of a heat insulated vessel is filled after heat treatment, hygroscopicity can be suppressed by enclosing dry gas or merely more or less preheating about 100° C. In FIG. 2, moisture absorption and release curves of calcium silicate molding are shown and as seen from this diagram, retaining temperature until the filling of the heat insulating space is sufficient with 100° C. In the diagram, A denotes a temperature raising curve and B a temperature lowering curve.

Thus molded supporting material is interposed in a space between inner and outer tanks, heated dry gas is introduced from an exhaust port 4 and then it is sucked out by means of a vacuum pump. By repeating this operation several times, moisture and other released gas in said supporting material are removed and within the heat insulated space including the supporting material a high degree of vacuum is retained. In this case, since the supporting material 3 has a continuous open cell structure, the vacuum sucking operation is easy and at the degree of vacuum of about $1 \times 10^{-2}$ Torr, sufficient uniform heat insulating performance can be obtained.

Figure 3:
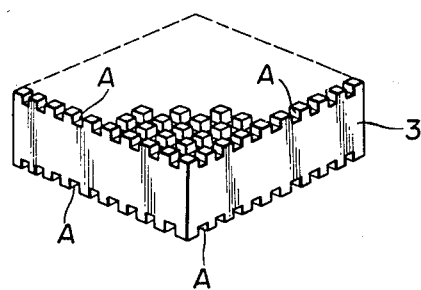
FIG. 3 is a perspective view showing an embodiment of supporting material.
Figure 4:
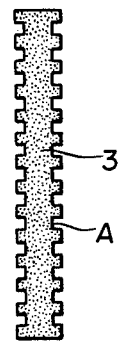
FIG. 4 is a sectional view of FIG. 3.

FIGS. 3 and 4 show an embodiment of supporting material 3, on which surfaces contacting with wall faces of the inner and outer tanks 1 and 2, grooves A are provided. The whole surfaces of the supporting material 3 are impregnated with a solution of sodium silicate, potassium silicate, ethyl silicate, or the like in the concentration of 1 to 10% wt., preferably 2 to 5% wt. The treated surfaces are then baked. This supporting material may be made as a vacuum heat insulation unit, and in this case, the molding made by said method is coated with metallic foil and plastic film and vacuum packed into a single unit, which is filled in single layer or layers between the inner and outer tanks. Thus a vacuum heat insulated tank similar to said heat insulated tank can be obtained. The grooves A extend both horizontally and longitudinally as shown in FIG. 3.

In this manner, by using Xonotlite type calcium silicate molding as supporting material for the vacuum heat insulating portion, the operation of a vacuum heat insulated vessel is simply performed. Namely, since this supporting material is an amorphous molding, it is handled during the manufacturing process of the heat insulated vessel and is excellent in workability. Emitted gas such as contained moisture can be removed preliminarily by directly effecting a heating degassing treatment. Since said calcium silicate has high heat resisting property, preliminary heating degassing treatment can be promptly effected at high temperature. And, since the supporting material has a continuous open cell structure, released gas such as moisture in the cell can be perfectly and easily removed in a vacuum exhaust treatment and heat insulated space filling. The vacuum exhaust process can be effected merely by introducing heated dry gas and making vacuum suction several times after filling of the heat insulated space. The exhaust process is simplified and time for exhaustion is extremely shortened in comparison with the usual vacuum exhaust process. Since this supporting material has an open cell structure and voids are continuous, vacuum exhausting property is good. Emitted gas is completely removed in the vacuum exhaust process, and heat transfer in vacuum space can be better prevented in comparison with the case of vacuum heat insulation by means of perlite. No gas is released thereafter, so that the degree of vacuum is surely retained at $1 \times 10^{-2}$ Torr. The retained degree of vacuum may be lower than usual; thus the degree of vacuum for obtaining predetermined thermal conductivity is stabilized from a relatively low degree of vacuum.

Figure 5:
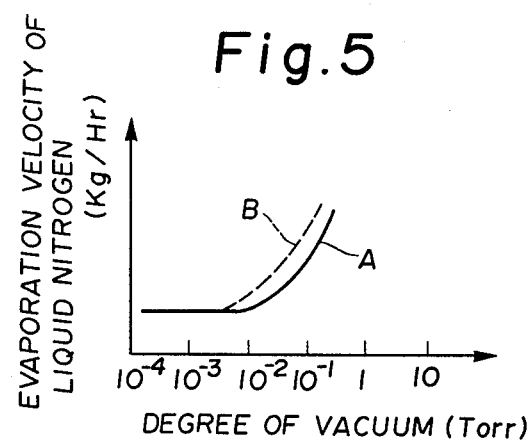
FIG. 5 shows the relation between evaporation velocity of liquid nitrogen and degree of vacuum in heat insulated space.

In FIG. 5, the relation between evaporation velocity of liquid nitrogen and degree of vacuum in heat insulated space is shown, wherein the case (A) of vacuum heat insulation using Xonotlite type calcium silicate molding and the case (B) using perlite powder are compared. Accordingly, it is found that when calcium silicate molding is used the required heat insulation characteristic can be obtained although the retained degree of vacuum is low. It is understood that required range of retained degree of vacuum is widened compared with a perlite vacuum heat insulated vessel and control of the degree of vacuum retaining becomes easy.

Since the supporting material has high resistance against compression and a continuous open cell structure (as opposed to those materials involving gas within a spherical body of closed cell structure such as perlite) and no gas is generated even though a concentrated load is imposed, the supporting material itself can receive vacuum load and thickness of inner and outer tanks may be made small. Thus, particularly in an open type heat insulated tank, heat input from an open side wall can be almost lost and the inner tank can be supported by this molding, so that no special supporting member is necessary for supporting the inner tank as in the usual case. Heat loss from the supporting member for the inner tank is eliminated. And, since the supporting material itself has light weight, the heat insulated tank becomes extremely light in its weight. Namely, the thickness of vessel may be made in several fraction of the usual one. Consequently, as a heat insulated tank, its price and weight are decreased in proportion to the decrease of thickness of the inner and outer tanks. These merits increase as the volume of the heat insulated tank becomes larger.

Figure 6:
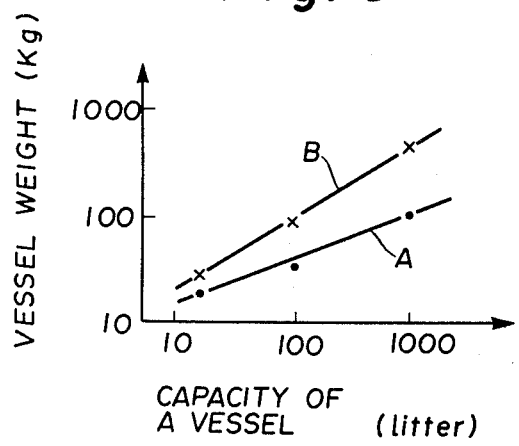
FIG. 6 shows the relation between capacity and weight of an open vessel.
Figure 7:
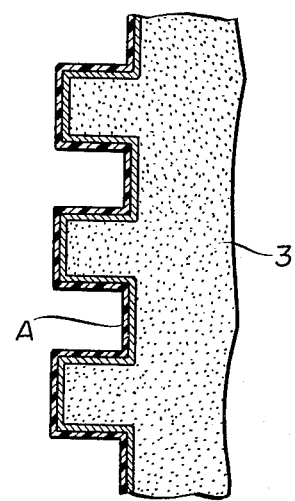
FIG. 7 is a sectional view of an embodiment of the invention wherein the molding is covered with a metallic foil and a plastic film.

In FIG. 6, the relation between capacity and weight of an open vessel is shown wherein the width of heat insulating space (interval between inner and outer tanks) is 5 cm. A vessel (A) using calcium silicate molding as supporting material and a vessel (B) using perlite powder are compared. The inner and outer tanks are respectively made of stainless steel, and in the vessel using calcium silicate molding as supporting material, the thickness of inner and outer tanks are respectively 1 mm. From this, it is understood that in case of using calcium silicate molding as supporting material, the weight of vessel can be considerably decreased. The hygroscopicity of calcium silicate having said Xonotlite type crystal structure is advantageous for retaining the degree of vacuum. When used as the supporting material for a storing vessel for low temperature liquefied gas, it has low temperature absorbing power (cryosorption effect or getter effect). For instance, adsorption occurs at low temperature such as liquefied nitrogen temperature and effectively adsorbs released gas and the like from moisture remaining in the supporting material, leaking in air component and structural material, (for instance, stainless steel) of the vessel body. It retains the predetermined degree of vacuum and the required degree of vacuum at room temperature at $1 \times 10^{-2}$ Torr as mentioned above. Perlite causes secular change in filling density due to empty weight after filling and sometimes results in non-uniform vacuum heat insulation. By employing a calcium silicate molding, such a secular lowering of vaccum heat insulation does not occur, and by retaining the lowest degree of vacuum of $10^{-2}$ torr, practically uniform heat insulation performance is obtained.

As mentioned above, because of high resistance against compression, the tank according to this invention can be practically used for a square shaped heat insulated tank, even though it is a vacuum heat insulated tank, without being limited to the usual spherical or cylindrical shape. Therefore, when it is used in the ordinary manner as a heat insulated tank for storing and conveying cold or refrigerated foodstuffs, the required cold can be preserved or the storage amount can be increased due to its high heat insulation performance. For instance, generally used heat insulated tanks for cold or refrigerated foodstuffs are using foamed polyurethane as heat insulating material, its thickness being about 100 mm. However, when similar heat insulation is sought in a heat insulated tank according to this invention, the thickness of supporting material at the degree of vacuum of $1 \times 10^{-2}$ Torr can be done with about $\frac{1}{3}$ the thickness thereof. Thus, the capacity of the heat insulated tank becomes larger, particularly when it is applied to a vehicle mounting, and a remarkable effect is obtained together with said lightening of weight.

Due to the excellent heat insulation performance as well as easy manufacturing, the heat insulated tank may be used not only for storing goods but also in other applications. For instance, low temperature part machinery in a low temperature apparatus such as an air separation plant etc. must be heat insulated and in general, it is effected by a method for filling the space portion between the heat insulated tank and the machinery with heat insulating material (slag). However, according to this method, it is necessary to remove filled heat insulating material and to fill it again even in case of local repairing and the like, thus frequent operation and working are required. By utilizing the invention, said operation and working are made easy, because it becomes unnecessary to fill any heat insulating material in the space portion between the heat insulated tank and the machinery.

In the above description, explanations are made mainly about the case, in which a calcium silicate molding having Xonotlite type crystal structure is used as supporting material. However, other alkaline earth metal silicate moldings having continuous open cell structures or composite material moldings based thereon as parent substance are also available with similar effect. It is also possible to provide grooves on the surfaces of said supporting material or to work with irregularities thereon. Use of the grooves makes it possible to decrease the area contacting with heat and to increase the heat insulating capability.

What is claimed is:

1. A heat insulated tank comprising inner and outer walls having a space therebetween; supporting material interposed in said space between said walls, said supporting material being a calcium silicate molding hving a xonotlite type crystal structure and a continuous open cell structure; amorphous type silicic acid, calcium compound and water being subjected to heating and pressing to form said calcium silicate molding; the interior facing surface and the exterior facing surface and said supporting material having criss-crossing grooves extending throughout the interior and exterior surfaces to provide a series of spaced apart projecting surfaces for limiting contact with said inner and outer walls thereby decreasing heat transfer, the entire interior and exterior surfaces being impregnated with a solution selected from the group consisting of sodium silicate, potassium silicate, and ethyl silicate and subjected to baking; said supporting material being coated by metallic foil and plastic film and vacuum packed to make a heat insulating unit said metallic foil and plastic film conforming to the interior and exterior surfaces of said supporting material.

* * * * *